United States Patent
Gattis et al.

(10) Patent No.: US 11,856,262 B2
(45) Date of Patent: *Dec. 26, 2023

(54) METHODS AND SYSTEMS FOR DYNAMIC CONTENT MODIFICATION

(71) Applicant: COMCAST CABLE COMMUNICATIONS, LLC, Philadelphia, PA (US)

(72) Inventors: Galen Trevor Gattis, Sunnyvale, CA (US); Weston Schmidt, San Jose, CA (US); James Chan, San Francisco, CA (US); Michael Thomason, Rohnert Park, CA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/969,457

(22) Filed: Oct. 19, 2022

(65) Prior Publication Data
US 2023/0046479 A1    Feb. 16, 2023

Related U.S. Application Data

(63) Continuation of application No. 15/073,216, filed on Mar. 17, 2016, now Pat. No. 11,533,539.

(51) Int. Cl.
*H04N 21/4545*  (2011.01)
*H04N 21/454*   (2011.01)
(Continued)

(52) U.S. Cl.
CPC ..... *H04N 21/45452* (2013.01); *H04N 21/435* (2013.01); *H04N 21/4394* (2013.01); *H04N 21/44008* (2013.01); *H04N 21/4415* (2013.01); *H04N 21/44218* (2013.01); *H04N 21/4532* (2013.01); *H04N 21/4542* (2013.01); *H04N 21/4884* (2013.01)

(58) Field of Classification Search
CPC ........ H04H 60/33; H04H 60/45; H04H 60/43; G06Q 30/02; H04N 7/163; H04N 21/4532; H04N 7/165; H04N 21/4623; H04N 21/84
(Continued)

(56) References Cited

U.S. PATENT DOCUMENTS 7,540,009 B1    5/2009  Bryant
7,805,680 B2    9/2010  Meyers
(Continued)

OTHER PUBLICATIONS

U.S. Appl. No. 15/073,216, filed Mar. 17, 2016, Galen Trevor Gattis (Comcast Cable Communications, LLC).

*Primary Examiner* — Nnenna N Ekpo
(74) *Attorney, Agent, or Firm* — Ballard Spahr LLP

(57) ABSTRACT

An example method can comprise receiving content for presentation at a user device. The content can comprise a plurality of sections, and each section can comprise a video portion and an audio portion. The user device can also receive content metadata regarding one or more features of the content, where the features of the content comprise one or more candidate sections of the content for modification. The user device can apply one or more rules to the received content based on the content metadata to modify one or more of the audio portion and the video portion of at least one section of the content, creating modified content, and can cause presentation of the modified content on a display device.

20 Claims, 7 Drawing Sheets

(51) Int. Cl.
  *H04N 21/45*   (2011.01)
  *H04N 21/44*   (2011.01)
  *H04N 21/439*  (2011.01)
  *H04N 21/442*  (2011.01)
  *H04N 21/4415* (2011.01)
  *H04N 21/435*  (2011.01)
  *H04N 21/488*  (2011.01)

(58) Field of Classification Search
  USPC ........................................ 725/11, 12, 25, 28
  See application file for complete search history.

(56) References Cited

U.S. PATENT DOCUMENTS

| | | | |
|---|---|---|---|
| 8,763,023 B1* | 6/2014 | Goetz | ................. H04H 60/377 |
| | | | 725/20 |
| 9,679,606 B2 | 6/2017 | Cary | |
| 2005/0086069 A1 | 4/2005 | Watson | |
| 2006/0031870 A1 | 2/2006 | Jarman | |
| 2007/0168853 A1 | 7/2007 | Jarman | |
| 2008/0250080 A1 | 10/2008 | Arrasvuori | |
| 2009/0089827 A1 | 4/2009 | Carlsgaard | |
| 2009/0089828 A1 | 4/2009 | Carlsgaard | |
| 2009/0313546 A1 | 12/2009 | Katpelly | |
| 2011/0161999 A1 | 6/2011 | Klappert | |
| 2012/0311625 A1 | 12/2012 | Nandi | |
| 2013/0054572 A1 | 2/2013 | Cummins | |
| 2013/0064525 A1 | 3/2013 | Cary | |
| 2014/0237501 A1 | 8/2014 | Berrier | |
| 2015/0035856 A1 | 2/2015 | Im | |
| 2015/0052439 A1* | 2/2015 | Pasquarette | ........... G06F 3/0486 |
| | | | 715/731 |
| 2015/0070516 A1 | 3/2015 | Shoemake | |
| 2016/0071132 A1 | 3/2016 | Roozen | |
| 2016/0124596 A1 | 5/2016 | Doerring | |
| 2016/0323643 A1 | 11/2016 | Panchaksharaiah | |

* cited by examiner

METHODS AND SYSTEMS FOR DYNAMIC CONTENT MODIFICATION

CROSS REFERENCE TO RELATED PATENT APPLICATION

This application claims priority under 35 U.S.C. § 120 to, and is a continuation of, U.S. patent application Ser. No. 15/073,216, filed Mar. 17, 2016, the entire contents of which are herein incorporated by reference in its entirety for all purposes.

BACKGROUND

A broad range of content is available for consumption, including live, pre-recorded, or on demand content. While some content is appropriate for any audience (e.g., a movie rated G by the Motion Picture Association of America), other content is not suitable for younger audiences. Often, a family wishes to consume content that includes one or more scenes that are not appropriate for younger viewers. Still further, a family may deem some types of potentially inappropriate content, (e.g., nudity) unfit for younger children, while other types of content (e.g., offensive language) are acceptable for all members of the family. Moreover, some content is mostly appropriate for all audiences, except for a few scenes or words.

Currently, many options for enabling parental control of content include a "v-chip" that facilitates completely blocking access to content based on a content rating. However, censorship allows for blocking of entire programs only, and does not allow for watching a modified version of a program to remove the offensive content. Further, the v-chip solution relies on content ratings, which may not be available for all content. These and other shortcomings are addressed in the present disclosure.

SUMMARY

It is to be understood that both the following general description and the following detailed description are exemplary and explanatory only and are not restrictive. Methods and systems for dynamically altering content to remove potentially offensive content portions are disclosed herein.

In an aspect, a user can establish one or more rules that can be used to modify content that the user consumes. The rules can be stored in a location accessible to a user device. When content (e.g., a plurality of content sections, each comprising a video portion and an audio portion) and content metadata are delivered to the user device, the user device can apply the stored rules, and can modify the delivered content based on the stored rules. For example, the content metadata can identify one or more of the plurality of content sections (e.g., scenes within a movie or television show) as candidates for modification. In some aspects, modifying the content can comprise applying and audio filter and/or a video filter to at least a portion of the content. In other aspects, modifying the content can comprise skipping portions of the content that violate the stored rules. The modified content can then be presented to the user for consumption.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
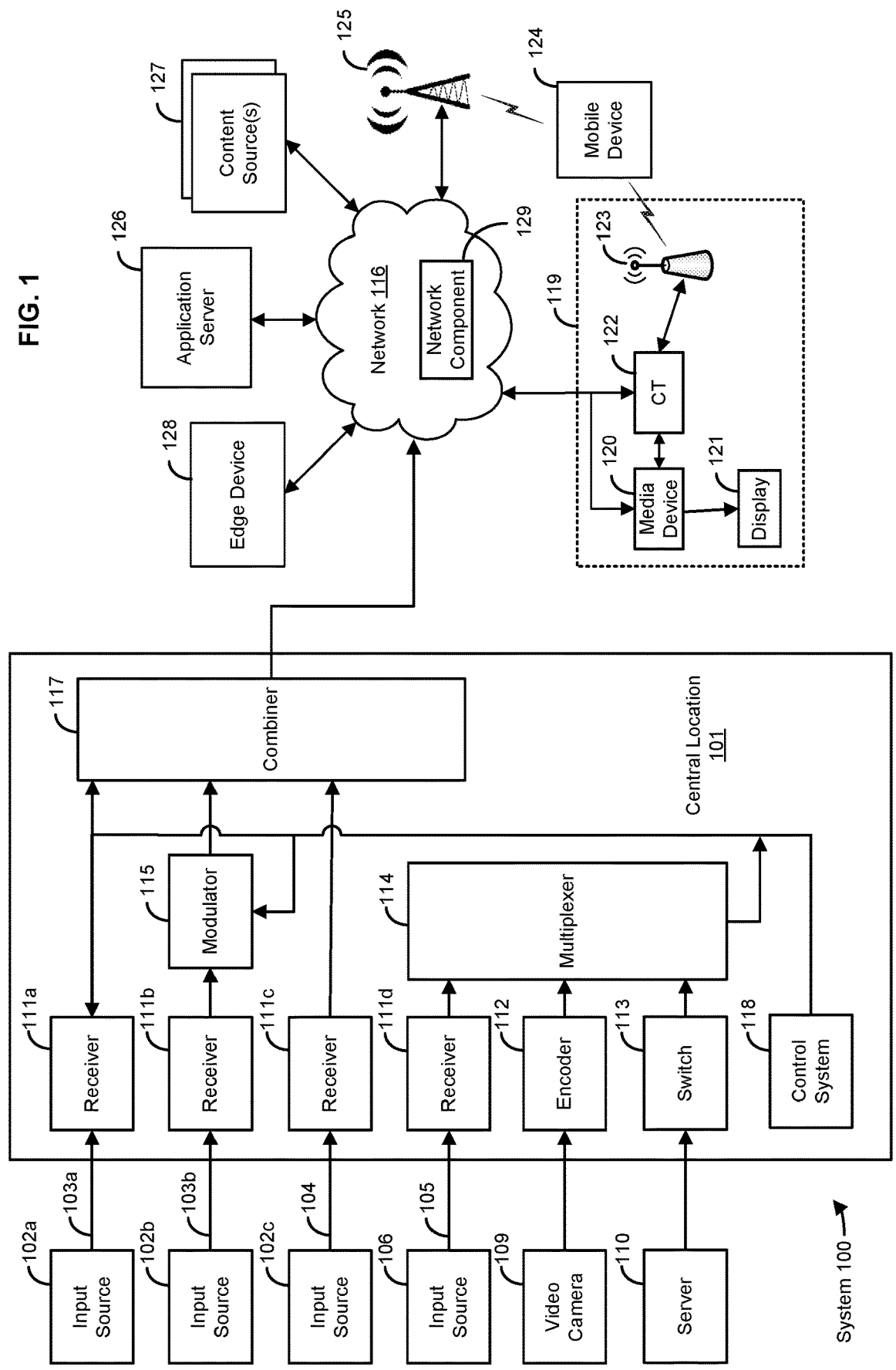
FIG. 1 is block diagram illustrating various aspects of an exemplary system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In one aspect, methods and systems of the present disclosure can use content metadata to dynamically edit content (e.g., audio and/or video content) being presented to one or more viewers. Metadata received with the content can provide information indicating potentially objectionable features of the content. For example, the metadata can broadly provide information related to categories such as violence, nudity, and offensive language. In an aspect, the metadata can comprise more nuanced descriptions of various aspects of the content. For example, the metadata can comprise an indication of one or more actors present in a scene (e.g., actor names for people present in the scene) and/or one or more actions performed by the actors (e.g., dialog, shooting, romance, fist fight, blood/gore, etc.). The metadata can further comprise closed captioning information and/or indications of non-verbal communication. The metadata can also comprise information indicating the importance of a particular portion of the content to the overall plot.

In an aspect, the methods and systems of the present disclosure can use the metadata to dynamically edit (e.g., modify) the content to produce edited content for presentation to one or more users. In an aspect, the dynamic editing can be performed by applying one or more filters to at least a portion of the content. For example, audio filters such as a mute, a bleep, a word replacement, a voice remove, a deejay reverse edit, and the like can be applied to audio content. As another example, filters such as a blur, a pixelate, a freeze, a cut to black, a graphic overlay, and the like can be applied to video content. The filters can be applied to all and/or a portion of a display screen. In another aspect, the editing can be performed by skipping at least a portion of the content. In other aspects, temporal effects such as "time stretching" (e.g., slowing down a playback speed) or "time compressing" (e.g., increasing the playback speed) can be applied to the content.

In an aspect, the dynamic editing can also comprise determining which users are currently within view of a device used to present the content (e.g., which users are consuming the content presented by the device), and editing the content based on the users present. For example, if one user dislikes blood, then a scene with blood could be obscured or skipped. As another example, user presence can also be determined dynamically, so that when a new user arrives within view of the device used to present the content, the content can be edited to match the new user's preferences. For example, if a user begins playback of a movie and a child arrives within view of the device used to present the content, the content can be edited to be appropriate for the child.

FIG. 1 illustrates various aspects of an exemplary system in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

A system 100 can comprise a central location 101 (e.g., a headend), which can receive content (e.g., data, input programming, and the like) from multiple sources. The central location 101 can combine the content from the various sources and can distribute the content to user (e.g., subscriber) locations (e.g., location 119) via a distribution system 116.

In an aspect, the central location 101 can receive content from a variety of sources 102a, 102b, 102c. The content can be transmitted from the source to the central location 101 via a variety of transmission paths, including wireless (e.g. satellite paths 103a, 103b) and a terrestrial path 104. The central location 101 can also receive content from a direct feed source 106 via a direct line 105. Other input sources can comprise capture devices such as a video camera 109 or a server 110. The signals provided by the content sources can include a single content item or a multiplex that includes several content items.

The central location 101 can comprise one or a plurality of receivers 111a, 111b, 111c, 111d that are each associated with an input source. For example, MPEG encoders, such as an encoder 112, are included for encoding local content or a video camera 109 feed. A switch 113 can provide access to the server 110, which can be a Pay-Per-View server, a data server, an interne router, a network system, a phone system, and the like. Some signals may require additional processing, such as signal multiplexing, prior to being modulated. Such multiplexing can be performed by a multiplexer (mux) 114.

The central location 101 can comprise one or a plurality of modulators 115 for interfacing to a network 116. The modulators 115 can convert the received content into a modulated output signal suitable for transmission over a network 116. The output signals from the modulators 115 can be combined, using equipment such as a combiner 117, for input into the network 116. In an aspect, the network 116 can comprise a content delivery network, a content access network, and/or the like. For example, the network 116 can be configured to provide content from a variety of sources using a variety of network paths, protocols, devices, and/or the like. The content delivery network and/or content access network can be managed (e.g., deployed, serviced) by a content provider, a service provider, and/or the like.

A control system 118 can permit a system operator to control and monitor the functions and performance of the system 100. The control system 118 can interface, monitor, and/or control a variety of functions, including, but not limited to, the channel lineup for the television system, billing for each user, conditional access for content distributed to users, and the like. The control system 118 can provide input to the modulators for setting operating parameters, such as system specific MPEG table packet organization or conditional access information. The control system 118 can be located at the central location 101 or at a remote location.

The network 116 can distribute signals from the central location 101 to user locations, such as a user location 119. The network 116 can comprise an optical fiber network, a coaxial cable network, a hybrid fiber-coaxial network, a wireless network, a satellite system, a direct broadcast system, an Ethernet network, a high-definition multimedia interface network, universal serial bus network, or any combination thereof.

In an aspect, a multitude of users can be connected to the network 116 at one or more of the user locations. At the user location 119, a media device 120 can demodulate and/or decode, if needed, the signals for display on a display device 121, such as on a television set (TV) or a computer monitor. For example, the media device 120 can comprise a demodulator, decoder, frequency tuner, and/or the like. The media device 120 can be directly connected to the network (e.g., for communications via in-band and/or out-of-band signals of a content delivery network) and/or connected to the network 116 via a communication terminal 122 (e.g., for communications via a packet switched network). The media device 120 can comprise a set-top box, a digital streaming device, a gaming device, a media storage device, a digital recording device, a combination thereof, and/or the like. The media device 120 can comprise one or more applications, such as content viewers, social media applications, news applications, gaming applications, content stores, electronic program guides, and/or the like. Those skilled in the art will appreciate that the signal can be demodulated and/or decoded in a variety of equipment, including the communication terminal 122, a computer, a TV, a monitor, or satellite dish.

In an aspect, the communication terminal 122 can be located at the user location 119. The communication terminal 122 can be configured to communicate with the network 116. The communications terminal 122 can comprise a modem (e.g., cable modem), a router, a gateway, a switch, a network terminal (e.g., optical network unit), and/or the like. The communications terminal 122 can be configured for communication with the network 116 via a variety of protocols, such as internet protocol, transmission control protocol, file transfer protocol, session initiation protocol, voice over internet protocol, and/or the like. For example, for a cable network, the communication terminal 122 can be configured to provide network access via a variety of communication protocols and standards, such as Data Over Cable Service Interface Specification.

In an aspect, the user location 119 can comprise a first access point 123, such as a wireless access point. The first access point 123 can be configured to provide one or more wireless networks in at least a portion of the user location 119. The first access point 123 can be configured to provide access to the network 116 to devices configured with a compatible wireless radio, such as a mobile device 124, the media device 120, the display device 121, or other computing devices (e.g., laptops, sensor devices, security devices). For example, the first access point 123 can provide a user managed network (e.g., local area network), a service provider managed network (e.g., public network for users of the service provider), and/or the like. It should be noted that in some configurations, some or all of the first access point 123, the communication terminal 122, the media device 120, and the display device 121 can be implemented as a single device.

In an aspect, the user location 119 may not be fixed. By way of example, a user can receive content from the network 116 on the mobile device 124. The mobile device 124 can comprise a laptop computer, a tablet device, a computer station, a personal data assistant (PDA), a smart device (e.g., smart phone, smart apparel, smart watch, smart glasses), GPS, a vehicle entertainment system, a portable media player, a combination thereof, and/or the like. The mobile device 124 can communicate with a variety of access points (e.g., at different times and locations or simultaneously if within range of multiple access points). For example, the mobile device 124 can communicate with a second access point 125. The second access point 125 can be a cell tower, a wireless hotspot, another mobile device, and/or other remote access point. The second access point 125 can be within range of the user location 119 or remote from the user location 119. For example, the second access point 125 can be located along a travel route, within a business or residence, or other useful locations (e.g., travel stop, city center, park).

In an aspect, the system 100 can comprise an application device 126. The application device 126 can be a computing device, such as a server. The application device 126 can provide services related to applications. For example, the application device 126 can comprise an application store. The application store can be configured to allow users to purchase, download, install, upgrade, and/or otherwise manage applications. For example, the application device 126 can be configured to allow users to download applications to a device, such as the mobile device 124, communications terminal 122, the media device 120, the display device 121, and/or the like. The application device 126 can run one or more application services to provide data, handle requests, and/or otherwise facilitate operation of applications for the user.

In an aspect, the system 100 can comprise one or more content source(s) 127. The content source(s) 127 can be configured to provide content (e.g., video, audio, games, applications, data) to the user. The content source(s) 127 can be configured to provide streaming media, such as on-demand content (e.g., video on-demand), content recordings, and/or the like. For example, the content source(s) 127 can be managed by third party content providers, service providers, online content providers, over-the-top content providers, and/or the like. The content can be provided via a subscription, by individual item purchase or rental, and/or the like. The content source(s) 127 can be configured to provide the content via a packet switched network path, such as via an internet protocol (IP) based connection. In an aspect, the content can be accessed by users via applications, such as mobile applications, television applications, set-top box applications, gaming device applications, and/or the like. An example application can be a custom application (e.g., by content provider, for a specific device), a general content browser (e.g., web browser), an electronic program guide, and/or the like.

In an aspect, the system 100 can comprise an edge device 128. The edge device 128 can be configured to provide content, services, and/or the like to the user location 119. For example, the edge device 128 can be one of a plurality of edge devices distributed across the network 116. The edge device 128 can be located in a region proximate to the user location 119. A request for content from the user can be directed to the edge device 128 (e.g., due to the location of the edge device and/or network conditions). The edge device 128 can be configured to package content for delivery to the user (e.g., in a specific format requested by a user device), provide the user a manifest file (e.g., or other index file describing segments of the content), provide streaming content (e.g., unicast, multicast), provide a file transfer, and/or the like. The edge device 128 can cache or otherwise store content (e.g., frequently requested content) to enable faster delivery of content to users.

In an aspect, the network 116 can comprise a network component 129. The network component 129 can comprise any device, module, and/or the like communicatively coupled to the network 116. For example, the network component 129 can comprise a router, a switch, a splitter, a packager, a gateway, a encoder, a storage device, a multiplexer, a network access location (e.g., tap), physical link, and/or the like.

In an exemplary embodiment, the methods and systems disclosed can be located within one or more of the central location 101 and the one or more media devices 120, displays 121, and/or mobile devices 124. In an aspect, a user can determine one or more rules to be applied to content viewed by the user. The rules can restrict the audio, video, and/or closed captioning portions of the content. In particular, certain content features including violence, nudity, harsh language, etc. can be selected to be removed from the content prior to display. In an aspect, the rules established by the user can be stored locally on a user device (e.g., the media device 120, the display 121, the mobile device 124, etc.). In another aspect, the rules can be stored in a location accessible by the user device. For example, the rules can be stored at a server corresponding to the content/service provider (e.g., in the central location 101, the application server 126, and/or the edge device 128).

In an aspect, the methods and systems can utilize digital audio/video compression such as MPEG, or any other type of compression. The Moving Pictures Experts Group (MPEG) was established by the International Standards Organization (ISO) for the purpose of creating standards for digital audio/video compression. The MPEG experts created the MPEG-1 and MPEG-2 standards, with the MPEG-1 standard being a subset of the MPEG-2 standard. The combined MPEG-1, MPEG-2, and MPEG-4 standards are hereinafter referred to as MPEG. In an MPEG encoded transmission, content and other data are transmitted in packets, which collectively make up a transport stream. Additional information regarding transport stream packets, the composition of the transport stream, types of MPEG tables, and other aspects of the MPEG standards are described below. In an exemplary embodiment, the present methods and systems can employ transmission of MPEG packets. However, the present methods and systems are not so limited, and can be implemented using other types of transmission and data.

The output of a single MPEG audio and/or video coder is called a transport stream comprised of one or more elementary streams. An elementary stream is an endless near real-time signal. For convenience, the elementary stream may be broken into data blocks of manageable size, forming a packetized elementary stream (PES). These data blocks need header information to identify the start of the packets and can comprise time stamps because packetizing disrupts the time axis. For transmission and digital broadcasting, for example, several programs and their associated PESs can be multiplexed into a multi program transport stream. A multi program transport stream has a program clock reference (PCR) mechanism that allows transmission of multiple clocks, one of which is selected and regenerated at the decoder.

A multi program transport stream can be more than just a multiplex of audio and video PESs. In addition to the compressed audio, video and data, a transport stream includes metadata describing the bit stream. This includes the program association table (PAT) that lists every program in the multi program transport stream. Each entry in the PAT points to a program map table (PMT) that lists the elementary streams making up each program. Some programs will be unencrypted, but some programs may be subject to conditional access (encryption) and this information is also carried in the metadata. The transport stream can be comprised of fixed-size data packets, for example, each containing 188 bytes. Each packet can carry a program identifier code (PID). Packets in the same elementary stream can all have the same PID, so that the decoder (or a demultiplexer) can select the elementary stream(s) it wants and reject the remainder. Packet continuity counts can help to ensure that every packet that is needed to decode a stream is received. A synchronization system can be used so that decoders can correctly identify the beginning of each packet and deserialize the bit stream into words.

A content item, such as a program, can be associated with a group of one or more PIDs that are related to each other. For instance, a multi program transport stream used in digital television might contain three programs, to represent three television channels. Suppose each channel consists of one video stream, one or two audio streams, and any necessary metadata. In an aspect, the metadata associated with the program can comprise, for example, one or more of information about a portion of the content, including information about the performers featured in the content (e.g., actor names, information regarding prominently featured props such as a featured car, etc.), information indicating a location at which the content takes place (e.g., a city, a building, etc.), and communication information (e.g., closed captioning information, a transcription of the dialog, a summary of non-verbal communication, etc.). The content metadata can further comprise, for example, information indicating an importance of the portion of the content to an overall plot of the content. The content metadata can also comprise information about actions taken during the portion of content (e.g., shooting, fistfight, romance, etc.). In an aspect, the content metadata can be provided by the content provider. In another aspect, the content/service provider can receive metadata from one or more users and can aggregate the received metadata, and can provide the metadata to a user. A receiver (e.g., the HCT 120) wishing to tune to a particular "channel" merely has to decode the payload of the PIDs associated with its program. It can discard the contents of all other PIDs.

A user device (e.g., the media device 120, the display 121, the mobile device 124, etc.) can receive the MPEG transport stream, including the metadata. The user device can also access the one or more rules set up by the user. In an aspect, the user device can apply the one or more rules to the content contained in the MPEG transport stream based on the metadata in the transport stream. In particular, the user device can identify portions of the content to be modified based on the content metadata. The user device can modify the identified portions of the content.

In an aspect, modifying the content can comprise applying an audio filter, video filter, and/or closed caption filter to at least a portion of the content. For example, applying the video filter can comprise pixelating, blurring, blacking out, or covering over a portion of the video content with a graphic, or applying any other filter that at least partially obscures video content. Applying the audio filter can comprise muting, beeping, word replacing, or applying any other filter that at least partially obscures audio content. Applying a closed caption filter can comprise deleting and/or replacing words with other words or characters. In another aspect, modifying the content can comprise skipping at least a portion of the content.

Figure 2:
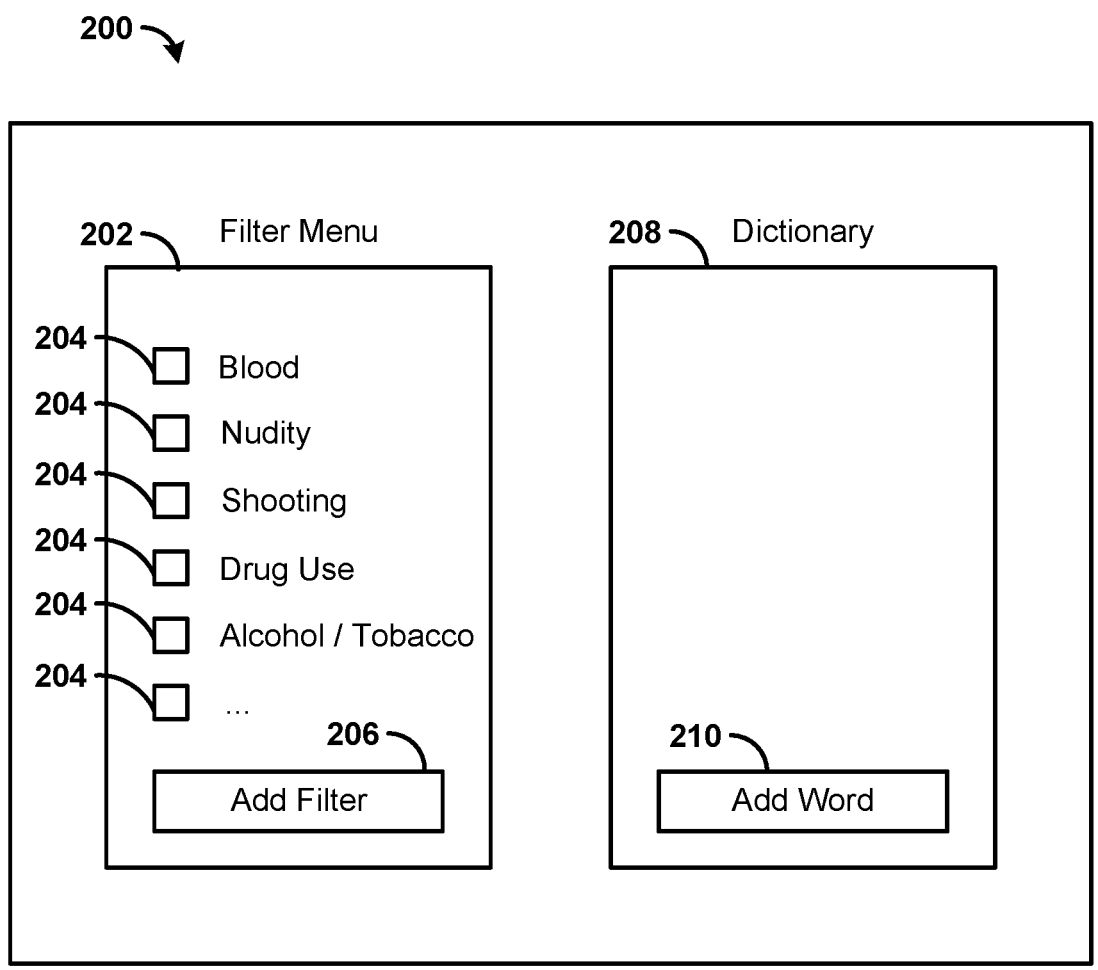
FIG. 2 is an illustration of a sample interface.

FIG. 2 shows an interface 200 for creating a rule. A user can select various categories of content to filter by selecting options from a menu 202. The menu 202 can comprise selection boxes 204 to allow the user options for filtering content. Additionally, the user can create filters for options not identified by the selection boxes 204 using the selectable element 206. The user can also choose to add words to a list (e.g., a dictionary) 208 of filter words by selecting a selectable element 210. The words added to the list 208 can cause creation of one or more new rules. In some aspects, the new rules can be stored locally (e.g., on the user device). In other aspects, the new rules can be stored remotely, in a separate storage device accessible by the user device. The one or more rules can be accessed by a user device, which can apply the rules to content based on one or more of metadata associated with the content and one or more users determined to be consuming the content, thereby modifying the content.

Figure 3:
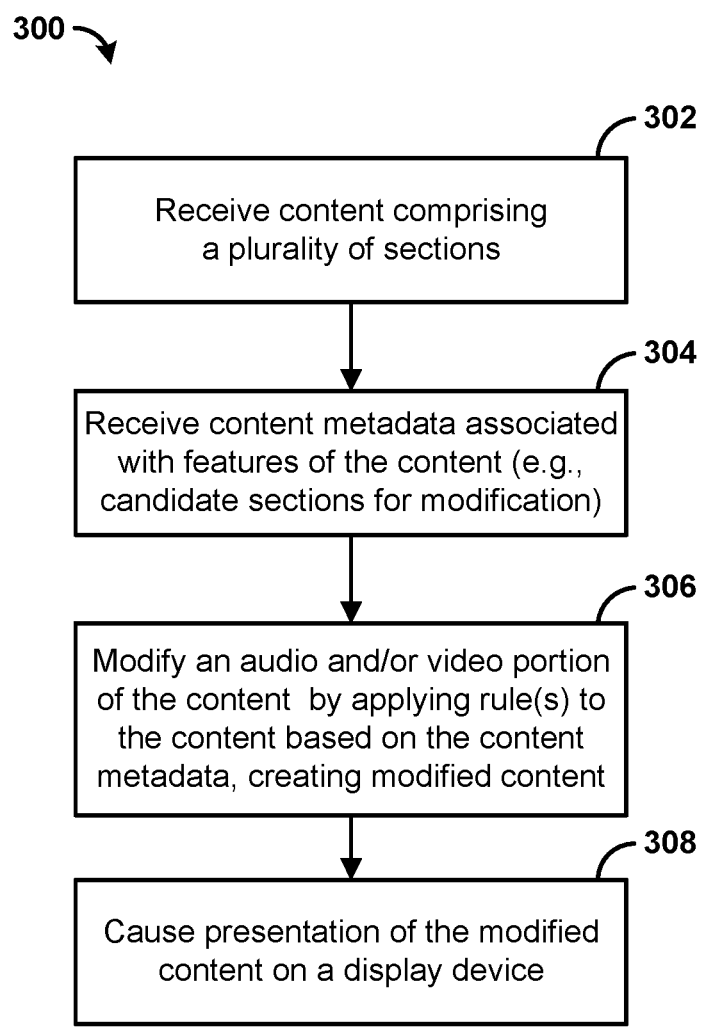
FIG. 3 is a flowchart illustrating an example method.

FIG. 3 shows an exemplary method 300. At step 302, a user device may receive content. In an aspect, the user device can comprise a set top box (e.g., the media device 120), a smart television (e.g., the display 121), a mobile device (e.g., the mobile device 124), a transportation media console, a tablet computing device, a smart watch, smart glasses, or the like. In an aspect, the content can comprise a plurality of sections, and each section can comprise an audio portion and/or a video portion. The content can be delivered as streaming content, as a file download, or through other similar delivery methods. In an aspect, the sections of the content can correspond to artistic divisions within the content. For example, feature video content (e.g., a movie or television show) can comprise a plurality of scenes, with each scene corresponding to a section of the content, and the audio content can comprise a plurality of tracks, with each track corresponding to a section of the content. Accordingly, a section of content can comprise, for example, a scene from a movie or television show, or an audio track.

At step 304, the user device may receive content metadata associated with the content. In an aspect, the content metadata can comprise information regarding one or more features of the content received in step 302. In an aspect, the content metadata can comprise information about one or more of the plurality of sections of the content, information about the performers featured in the content (e.g., actor names, information regarding prominently featured props such as a featured car, etc.), information indicating a location at which the content takes place (e.g., a city, a building, etc.), communication information (e.g., closed captioning information, a transcription of the dialog, a summary of nonverbal communication, etc.), a combination thereof, and/or the like. The content metadata can further comprise, for example, information indicating an importance of the section of the content to an overall plot of the content. In some aspects, the content metadata can also comprise information indicating one or more candidate sections for content modification (e.g., content obscuration and/or content highlighting). For example, the content metadata can include an indication of sections of a movie (e.g., scenes) comprising gore as candidate sections for obscuration. As another example, the content metadata could identify scenes within an action movie comprising a particular brand of car so that the car be highlighted. The content metadata can also comprise information about actions taken during the section of content (e.g., shooting, fistfight, romance, etc.) The content metadata can also comprise viewport location information (e.g., (x,y) coordinates indicating a top left (x,y) and/or a bottom right (x,y) corner of a rectangle that covers a particular object and/or word) and trajectory information which can instruct the user device and/or be interpreted by the user device to obfuscate or enhance a particular object and/or word over time. The content metadata can also comprise an indication of a time at which an associated event occurred within a storyline of the content (e.g., "universal time" information) which would allow a user device to form a rule to play movies in "universal time" order. In some aspects, the content metadata can also comprise word start and end information indicating a time at which audio of a word starts and stops so that the word audio can be altered or replaced. The content metadata can also comprise start and/or end time data to which a particular portion of the content metadata applies (e.g., a system time for which the content metadata applies). The content metadata can also comprise an indication of a "strength" of each attribute. For example, a tag can be assigned a strength value (e.g., between 0 and 1) based on a severity. As a specific example, a "blood" tag can be assigned a strength of 0.1 for a small amount of blood or a strength of 0.98 for a scene with an intense amount of blood.

In an aspect, the content metadata can be transmitted to the user device. In an aspect, the content metadata can be transmitted in a vertical blanking interval of the content. In another aspect, the content metadata can be transmitted to the user device as an additional stream of information within a Motion Picture Experts Group (MPEG) transport stream (TS). In some aspects, a separate packet identifier (PID) can be linked to a program stream that transmits the content through the program map table (PMT).

In step 306, the user device can modify one or more of the audio portion and the video portion of at least one section of the content by applying one or more rules to the received content based on the content metadata to, creating modified content. In an aspect, one or more users can be associated with the user device. The one or more rules can be associated with each of the one or more users. For example, the one or more rules can be stored on the user device, on a server associated with the content provider and in communication with the user device, or in another location accessible by the user device. Each user can register presence with the user device. For example, each user can log in to the user device by providing a user name and/or password. As another example, the user device can comprise a camera used for capturing still images and/or video of one or more users viewing content presented by the user device. The user device can use facial recognition technology to identify the one or more users. As another example, the user device can comprise voice recognition systems that can detect a speaker's voice (e.g., using a spoken login) and determine that the user is present. The home wireless gateway can also detect personal devices such as smart watches, fitness devices, phones, tablets, and laptops that have been tied to a particular user using, for example, Bluetooth Low Energy (BLE), radio frequency (RF) communication protocols such as near field communication (NFC), or Wi-Fi to detect a MAC or IP address associated with the personal devices. In some aspects, the user device can comprise a fingerprint enabled remote control. Using the fingerprint enabled remote can also provide user presence information.

In an aspect, after determining the one or more users, one or more rules associated with each user can be retrieved. For example, the one or more rules can be retrieved from a local storage, from a network storage device in communication with the user device, or a combination thereof. Once the one or more rules for each of the users have been retrieved, a rules engine can be used to apply the one or more rules. In an aspect, the one or more rules can comprise modifications to the video and/or audio components of the content.

In an aspect, at least one (or each) rule of the one or more rules can comprise a modification to one or more of a video component, audio component, or closed caption portion of the content. At least one (or each) rule of the one or more rules can also comprise one or more conditions necessary to apply the modification. In an aspect, the one or more conditions can be determined based on the content metadata. For example, a condition can comprise one or more of a presence of blood, particular types of violence (e.g., shooting, stabbing, fist fight, etc.), or sexual content (e.g., kissing, nudity, sexual activity, etc.). In other aspects, a condition can comprise presence of a particular person and/or product on screen in content. If the one or more conditions are satisfied (e.g., a threshold is exceeded), at least one feature in a portion of the video content can be altered (e.g., obscured or highlighted). In an aspect, obscuring a feature in a portion of the video can comprise blurring, pixelating, blacking out, or applying other masks to the video. In an aspect, highlighting a feature can comprise, for example, blurring, pixelating, and/or reducing brightness of all areas of content except a region containing the condition.

In some aspects, a rule of the one or more rules can comprise altering the content to provide playback chronologically with respect to the "universal time" presented in the content. That is, portions of content can be reorganized to be presented so that flashback portions of movies would occur first, then the main movie storyline. Such a reorganization can be helpful for users who have difficulty following a storyline presented out of chronological order. To achieve this reorganization, the user device can arrange the plurality of sections of the content according to the time at which an associated event occurred within a storyline of the content (e.g., the "universal time" information) from the content metadata.

In another aspect, portions of the video content that comprise features which meet the one or more conditions established by the rules can be skipped completely. In particular, in response to a determination that a portion of the content comprises video that meets the conditions, the rules engine can cause the user device to advance the content to the end of the portion. For example, in the case of skipping blood, the content metadata can comprise a content tag of "blood", and also time information as to when the "blood" content begins and ends. Accordingly, the user device can identify a time when there will no longer be blood (e.g., or a certain level of blood) in the video portion, and can cause content playback to jump ahead to an end time of the blood scene based on the time information.

In some aspects, a determination can be made regarding whether to obscure a feature in the portion of the video or to skip the portion of video comprising the content. In an aspect, the content metadata can be used to make the determination. For example, the information regarding the importance of the portion to the overall plot of the content can be used to determine if the portion of content should be skipped or otherwise modified. As a particular example, the importance transmitted in the content metadata can comprise a number indicating relative importance of the section to the overall plot of the content. When the number is greater than or equal to a predetermined threshold, the content can be obscured so that a majority of the portion of content can be viewed. When the number is less than the threshold, the portion of the content can be skipped.

Portions of the audio content can also be obscured or skipped. In an aspect, one or more rules can comprise a condition based on audio content. In particular, the condition can comprise one or more words to be avoided during content. The one or more words can be stored in a list (e.g., a dictionary) associated with a user. In an aspect, a transcription (e.g., or a closed caption) of the dialog can be compared to the list to determine if the words in the list are present in the transcription. In an aspect, when one of the words present in the list is also present in the transcription, the portion of audio content can be modified. For example, an audio filter can be applied to the audio portion. In an aspect, the filter can comprise muting, beeping, word replacement, voice removal, or other audio filters. In an aspect, closed caption information can also be modified to prevent display of the list word. For example, the user device can rewrite or edit the closed caption information on the fly to remove the list word so that a displaying device can display the closed caption data without the presence of the list word.

In another aspect, the portions of the audio content that comprise features which meet the one or more conditions established by the rules can be skipped completely. In particular, in response to a determination that a portion of the audio content comprises audio meets the conditions (e.g., audio comprising a word that exists in the list), the rules engine can cause the user device to advance the content to the end of the portion. In other aspects, the content metadata can comprise a start time and an end time for the matching word to censor within the audio stream, and the rules engine can cause the user device to skip to the end time of that word, thus never presenting it to the user.

In yet another aspect, a determination can be made regarding whether to modify a portion of the audio content or to skip the portion of content comprising the audio content. In an aspect, the content metadata can be used to make the determination. For example, the information regarding the importance of the portion to the overall plot of the content can be used to determine if the portion of content should be skipped or modified. As a particular example, the importance transmitted in the content metadata can comprise a number indicating relative importance of the section to the overall plot of the content. When (or if) the number is greater than or equal to a predetermined threshold, the content can be modified so that a majority of the portion of content can be viewed. When (or if) the number is less than the threshold, the portion of the content can be skipped.

In an aspect, applying the one or more rules can produce modified content, whereby one or more portions of the content are modified and/or one or more portions of the content are skipped. In step 308, the user device may cause presentation of the modified content on a display device. In an aspect, the modified content can be provided (e.g., shown, rendered, displayed, presented) to the one or more users.

Figure 4:
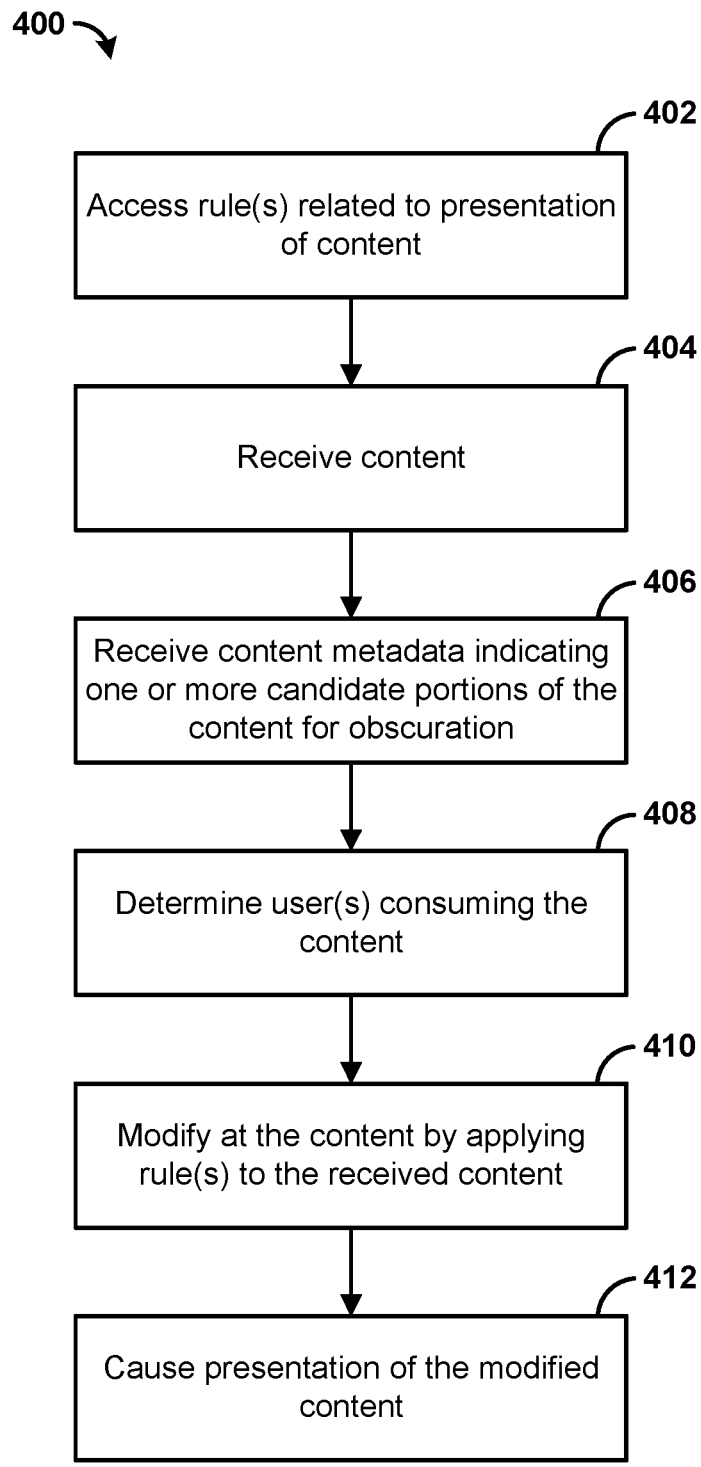
FIG. 4 is a flowchart illustrating an example method.

FIG. 4 shows an exemplary method 400. In step 402, a user device can access one or more rules. The one or more rules can be related to presentation of content. In an aspect, the user device can comprise the media device 120, the display 121, the mobile device 124, or other smart devices for providing content to a user. In an aspect, the one or more rules can be stored locally on the user device or remotely. For example, the rules can be stored on a server associated with a content or service provider, or on any other server accessible by the user device. In an aspect, the one or more rules can be associated with one or more users consuming the content.

In step 404, the user device can receive content for presentation. In an aspect, the content can comprise audio and/or video content. The content can be delivered as streaming content, as a file download, or through other known delivery methods. In an aspect, the content can comprise portions. For example, video content can comprise one or more scenes. Audio content can comprise one or more tracks. In an aspect, the content can be received from a content or service provider.

In step 406, the user device can receive content metadata. In an aspect, the content metadata can comprise information that describes the content received in step 402. For example, the content metadata can comprise information indicating one or more candidate portions of the content for modification, such as obscuration, enhancement, skipping, and/or the like. As a particular example, the content metadata could identify portions (e.g., scenes) of a horror movie comprising gore as candidate portions for obscuration. In an aspect, the content metadata can comprise information about a portion of the content, including information about the performers featured in the content (e.g., actor names, information regarding prominently featured props such as a featured car, etc.), information indicating a location at which the content takes place (e.g., a city, a building, etc.), and communication information (e.g., closed captioning information, a transcription of the dialog, a summary of non-verbal communication, etc.), combinations thereof, and/or the like. The content metadata can further comprise, for example, information indicating an importance of the portion of the content to an overall plot of the content. The content metadata can also comprise information about actions taken during the portion of content (e.g., shooting, fistfight, romance, etc.) The content metadata can further comprise viewport location information (e.g., (x, y) coordinates indicating a top left coordinate and/or a bottom right coordinate serving as a corner of a rectangle that covers a particular object and/or word) and trajectory information which can allow a particular object and/or word to be obfuscated or enhanced in appearance over time. The content metadata can also comprise an indication of a time at which an associated event occurred within a storyline of the content (e.g., "universal time" information). In some aspects, the content metadata can further comprise word start and/or end information indicating a start and/or end time of a word within content audio information. In some aspects, the content metadata can further comprise an intensity rating associated with each of the actions, indicating a severity of the action. For example, a tag can be assigned a strength value (e.g., between 0 and 1) based on a severity. As a specific example, a "blood" tag can be assigned a strength of 0.1 for a small amount of blood or a strength of 0.98 for a scene with an intense amount of blood.

In an aspect, the content metadata can be transmitted to the user device. In an aspect, the content metadata can be transmitted in a vertical blanking interval of the content. In another aspect, the content metadata can be transmitted to the user device as an additional stream of information within a Motion Picture Experts Group (MPEG) transport stream (TS). In some aspects, a separate packet identifier (PID) can be linked to a program stream that transmits the content through a program map table (PMT).

In step 408, the user device can determine (e.g., identify) one or more users consuming the content. In an aspect, the one or more users can be associated with the user device, and one or more rules can be associated with each of the one or more users. For example, each user can register a presence with the user device. In an aspect, registering user presence with the user device can comprise each user logging in to the user device by providing a user name and/or password. As another example, the user device can comprise a camera used for capturing still images and/or video of one or more users viewing content presented by the user device. The user device can use facial recognition technology to identify the one or more users. As another example, the user device can comprise a voice recognition system that can detect a speaker's voice (e.g., using a spoken login) and determine that a user is present based on the voice. In some aspects, the user device can detect personal devices (e.g., smart watches, wearable fitness devices, smartphones, tablets, laptops, and the like) that have been tied to a particular user using, for example, Bluetooth Low Energy (BLE), radio frequency (RF), communications protocols such as near field communication (NFC), or Wi-Fi to detect a MAC or IP address associated with the personal devices. In some aspects, the user device can comprise a fingerprint enabled remote control. Using the fingerprint enabled remote control can also provide user presence information.

In step 410, the user device can modify the received content based on the content metadata by applying at least one of the one or more rules to the received content to create modified content. In an aspect, the one or more rules can be applied based on the users determined in step 408. For example, each of the rules accessed by the user device can be associated with one or more users. The rules engine can select only rules associated with identified users to apply.

In an aspect, after determining the one or more users, one or more rules associated with each of the determined users can be retrieved. Once the one or more rules for each of the determined users have been retrieved, a rules engine can be used to apply the one or more rules. In an aspect, the rules can comprise modifications to the video and/or audio components of the content.

In some aspects, one or more of the audio and/or the closed captioning information can be adjusted based on the one or more identified users. For example, closed captioning information can be delivered using one or more language tracks, and audio information can include one or more audio tracks. A user can select a preferred language for closed caption information and/or audio (e.g., a user can prefer Spanish audio and Spanish closed caption information). Accordingly when a user presence is detected, the audio track and/or the closed caption information language track can be selected based on the user preferences.

In an aspect, each rule can comprise a modification to one or more of a video component, an audio component, and/or a closed captioning component of the content. Each rule can also comprise one or more conditions necessary to apply the modification. In an aspect, the one or more conditions can be determined based on the content metadata. For example, a condition can comprise one or more of a presence of blood, particular types of violence (e.g., shooting, stabbing, fist fight, etc.), or sexual content (e.g., kissing, nudity, sexual activity, etc.). In other aspects, a condition can comprise presence of a particular person and/or object on screen in the content. If the one or more conditions are satisfied, at least one feature in a portion of the video content can be altered (e.g., highlighted or obscured). In an aspect, highlighting a feature can comprise, for example, blurring, pixelating, or reducing a brightness of all areas of the content except an area comprising the feature. In an aspect, obscuring a feature in a portion of the video can comprise blurring, pixelating, blacking out, or applying other masks to the video.

In another aspect, portions of the video content that comprise features which meet the one or more conditions established by the rules can be skipped completely. In particular, in response to a determination that a portion of the content comprises video that meets the conditions, the rules engine can cause the user device to advance the content to the end of the portion. For example, in the case of skipping blood, the content metadata can comprise a content tag of "blood" and time information indicating a time at which the "blood" content beings and a time at which the "blood" content ends. The user device can identify the time at which the "blood" content ends and can cause content playback to skip to that time.

In yet another aspect, a determination regarding whether to obscure a feature in the portion of the video or to skip the portion of video comprising the content. In an aspect, the content metadata can be used to make the determination. For example, the information regarding the importance of the portion to the overall plot of the content can be used to determine if the portion of content should be skipped or otherwise modified. As a particular example, the importance transmitted in the content metadata can comprise a number indicating relative importance of the section to the overall plot of the content. When the number is greater than or equal to a predetermined threshold, the content can be obscured so that a majority of the portion of content can be viewed. When the number is less than the threshold, the portion of the content can be skipped.

Portions of the audio content can also be obscured or skipped. In an aspect, one or more rules can comprise a condition based on audio content. In particular, the condition can comprise one or more words to be avoided during content. The one or more words can be stored in a list (e.g., a dictionary) associated with a user. In an aspect, the transcription of the dialog can be compared to the list to determine if the words in the list are present in the transcription. In an aspect, when one of the words present in the list is also present in the transcription, the portion of audio content can be modified. For example, an audio filter can be applied to the audio portion. In an aspect, the filter can comprise muting, beeping, word replacement, voice removal, or other audio filters. In an aspect, the closed caption information can also be modified to prevent display of the list word. For example, the word can be blurred, pixelated, blacked out, etc. As another example, the user device can rewrite closed caption information on the fly to remove the list word so that a displaying device can display the closed caption information without the presence of the list word.

In another aspect, the portions of the audio content that comprise features which meet the one or more conditions established by the rules can be skipped completely. In particular, in response to a determination that a portion of the audio content comprises audio meets the conditions (e.g., audio comprising a word that exists in the list), the rules engine can cause the user device to advance the content to the end of the portion. In other aspects, the content metadata can comprise a start time and an end time for the matching word to censor within the audio component, and the rules engine can cause the user device to skip to the end time of the matching word, thus not presenting the matching word to the user. In some aspect, when the content comprises both an audio component and a video component, the rules engine can cause both the audio component and the video component to skip by the same amount.

In yet another aspect, a determination regarding whether to modify a portion of the audio content or to skip the portion of content comprising the audio content. In an aspect, the content metadata can be used to make the determination. For example, the information regarding the importance of the portion to the overall plot of the content can be used to determine if the portion of content should be skipped or modified. As a particular example, the importance transmitted in the content metadata can comprise a number indicating relative importance of the section to the overall plot of the content. When the number is greater than or equal to a predetermined threshold, the content can be modified so that a majority of the portion of content can be viewed. When the number is less than the threshold, the portion of the content can be skipped.

In an aspect, applying the one or more rules can produce modified content, whereby one or more portions of the content are modified and/or one or more portions of the content are skipped. In step 412, the user device can cause presentation of the modified content on a display device. In an aspect, the user device can cause presentation of the modified content to the one or more users.

Figure 5:
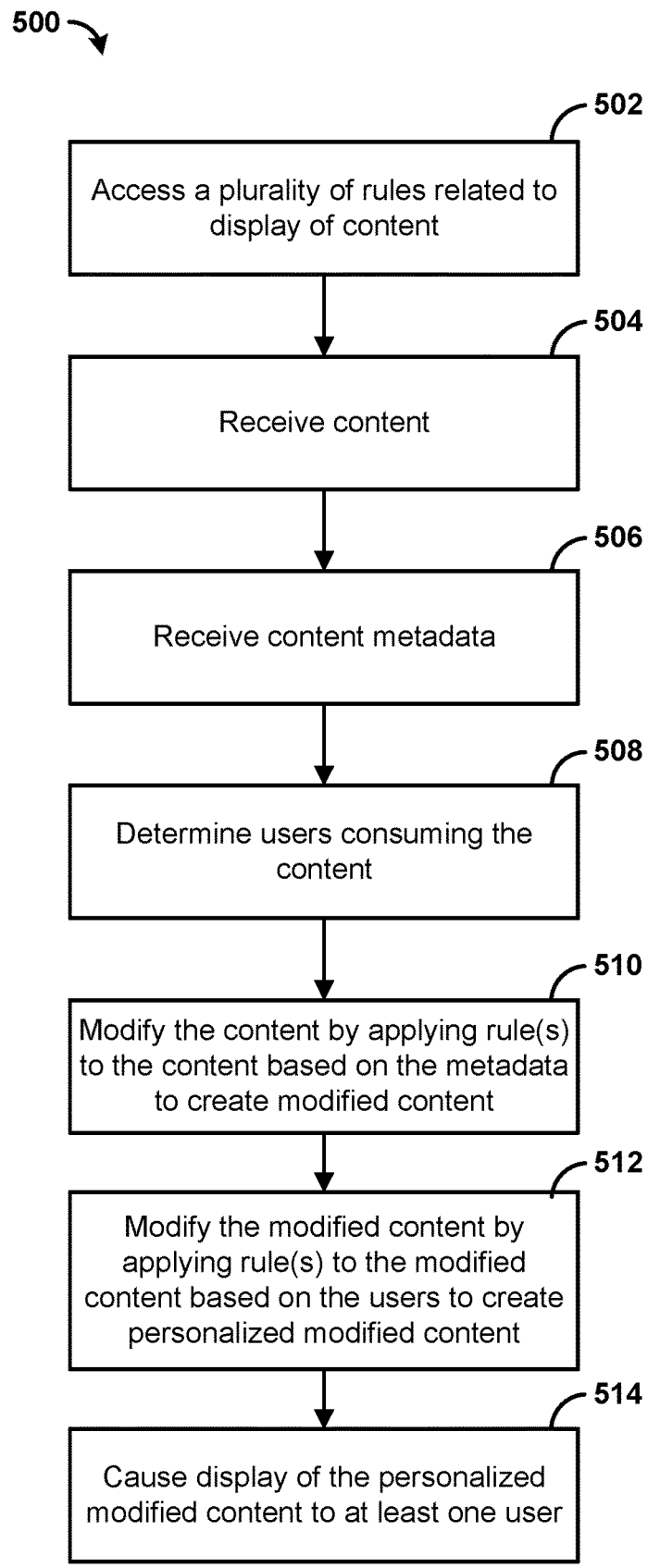
FIG. 5 is a flowchart illustrating an example method.

FIG. 5 shows an exemplary method 500. In step 502, a user device can access a plurality of rules related to presentation of content. In an aspect, the user device can comprise the media device 120, the display 121, the mobile device 124, or other smart devices for providing content to a user. In an aspect, the one or more rules can be stored locally on the user device or remotely. For example, the rules can be stored on a server associated with a content or service provider, or on any other server accessible by the user device. In an aspect, the one or more rules are associated with one or more users consuming the content.

In step 504, the user device can receive content. In an aspect, the content can comprise audio and/or video content. The content can be delivered as streaming content, as a file download, or through other known delivery methods. In an aspect, the content can comprise portions. For example, video content can comprise one or more scenes, and audio content can comprise one or more tracks. In an aspect, the content can be received from a content or service provider.

In step 506, the user device can receive content metadata. In an aspect, the content metadata can comprise information that describes the content received in step 502. In an aspect, the content metadata can comprise one or more of information about a portion of the content, including information about the performers featured in the content (e.g., actor names, information regarding prominently featured props such as a featured car, etc.), information indicating a location at which the content takes place (e.g., a city, a building, etc.), and communication information (e.g., closed captioning information, a transcription of the dialog, a summary of non-verbal communication, etc.). The content metadata can further comprise, for example, information indicating an importance of the portion of the content to an overall plot of the content. The content metadata can also comprise information about actions taken during the portion of content (e.g., shooting, fistfight, romance, etc.) The content metadata can further comprise viewport location information (e.g., (x, y) coordinates indicating a top left coordinate and/or a bottom right coordinate serving as a corner of a rectangle that covers a particular object and/or word) and trajectory information which can allow a particular object and/or word to be obfuscated or enhanced in appearance over time. The content metadata can also comprise an indication of a time at which an associated event occurred within a storyline of the content (e.g., "universal time" information). In some aspects, the content metadata can further comprise word start and/or end information indicating a start and/or end time of a word within content audio information. In some aspects, the content metadata can further comprise an intensity rating associated with each of the actions. For example, a tag can be assigned a strength value (e.g., between 0 and 1) based on a severity. As a specific example, a "blood" tag can be assigned a strength of 0.1 for a small amount of blood or a strength of 0.98 for a scene with an intense amount of blood.

In an aspect, the content metadata can be transmitted to the user device. In an aspect, the content metadata can be transmitted in a vertical blanking interval of the content. In another aspect, the content metadata can be transmitted to the user device as an additional stream of information within a Motion Picture Experts Group (MPEG) transport stream (TS). In some aspects, a separate packet identifier (PID) can be linked to a program stream that transmits the content through the program map table (PMT).

In step 508, the user device can determine (e.g., identify) a plurality of users consuming the content. In an aspect, the plurality of users can be associated with the user device, and one or more rules can be associated with each of the one or more users. For example, each of the plurality of users can register a presence with the user device. In an aspect, registering user presence with the user device can comprise each user logging in to the user device by providing a user name and/or password. As another example, the user device can comprise a camera used for capturing still images and/or video of one or more users viewing content presented by the user device. The user device can use facial recognition technology to identify each of the plurality of users. As an example, the user device can comprise a voice recognition system that can detect a speaker's voice (e.g., using a spoken login) and determine that the speaker is present as a user. The user device can also detect personal devices (e.g., smart watches, wearable fitness devices, smart phones, tablets, laptop computers, and the like) that have been tied to a particular user using, for example, Bluetooth Low Energy (BLE), radio frequency (RF) communication protocols such as Near Field Communication (NFC), or Wi-Fi to detect a MAC or IP address associated with the personal devices. In some aspects, the user device can comprise a fingerprint enabled remote control device. The fingerprint enabled remote control device to control the user device can also provide user presence information.

In step 510, the user device can modify the received by applying at least one of the plurality of rules to the content based on the content metadata to create modified content. In an aspect, each rule can comprise a modification to one or more of a video component and an audio component of the content. Each rule can also comprise one or more conditions necessary to apply the modification. In an aspect, the one or more conditions can be determined based on the content metadata. For example, a condition can comprise one or more of a presence of blood, particular types of violence (e.g., shooting, stabbing, fist fight, etc.), or sexual content (e.g., kissing, nudity, sexual activity, etc.). If the one or more conditions are satisfied, at least one feature in a portion of the video content can be obscured. In an aspect, obscuring a feature in a portion of the video can comprise blurring, pixelating, blacking out, or applying other masks to the video.

In another aspect, portions of the video content that comprise features which meet the one or more conditions established by the rules can be skipped completely. In particular, in response to a determination that a portion of the content comprises video that meets the conditions, the rules engine can cause the user device to advance the content to the end of the portion.

In yet another aspect, the user device can determine whether to obscure a feature in the portion of the video or to skip the portion of video comprising the content. In an aspect, the content metadata can be used to make the determination. For example, the information regarding the importance of the portion to the overall plot of the content can be used to determine if the portion of content should be skipped or otherwise modified. As a particular example, the importance transmitted in the content metadata can comprise a number indicating relative importance of the section to the overall plot of the content. When the number is greater than or equal to a predetermined threshold, the content can be obscured so that a majority of the portion of content can be viewed. When the number is less than the threshold, the portion of the content can be skipped.

Portions of the audio content can also be obscured or skipped. In an aspect, one or more rules can comprise a condition based on audio content. In particular, the condition can comprise one or more words to be avoided during content. The one or more words can be stored in a list (e.g., a dictionary). In an aspect, the transcription of the dialog can be compared to the list to determine if the words in the list are present in the transcription. In an aspect, when one of the words present in the list is also present in the transcription, the portion of audio content can be modified. For example, an audio filter can be applied to the audio portion. In an aspect, the filter can comprise muting, beeping, word replacement, voice removal, or other audio filters. In an aspect, the closed caption information can also be modified to prevent display of the list word. For example, the word can be blurred, pixelated, blacked out, etc. In some aspects, the user device can rewrite the closed caption information substantially in real time to remove the list word so that a displaying device can display the closed caption information without the presence of the list word.

In another aspect, the portions of the audio content that comprise features which meet the one or more conditions established by the rules can be skipped completely. In particular, in response to a determination that a portion of the audio content comprises audio meets the conditions (e.g., audio comprising a word that exists in the list), the rules engine can cause the user device to advance the content to the end of the portion.

In yet another aspect, a determination regarding whether to modify a portion of the audio content or to skip the portion of content comprising the audio content. In an aspect, the content metadata can be used to make the determination. For example, the information regarding the importance of the portion to the overall plot of the content can be used to determine if the portion of content should be skipped or modified. As a particular example, the importance transmitted in the content metadata can comprise a number indicating relative importance of the section to the overall plot of the content. When the number is greater than or equal to a predetermined threshold, the content can be modified so that a majority of the portion of content can be viewed. When the number is less than the threshold, the portion of the content can be skipped.

In step 512, the user device can modify the modified content by applying at least one of the plurality of rules to the modified content based on the identified plurality of users consuming the content to create personalized modified content. In an aspect, rules can be applied to a video portion of the modified content based on the presence of a particular user. For example, a particular user may be a child, and consequently the tolerances for presence of nudity and/or violence in content consumed by the user can be reduced. As another example, a particular user may have an exaggerated fear of particular content (e.g., fear of blood, fear of car crashes, etc.). Accordingly, content matching a user's particular fears can be avoided. The rules can be applied to the modified content to create personalized modified content.

In another aspect, a user may be particularly sensitive to particular words. Accordingly, the user may have a specialized list (dictionary) that comprises additional words to be avoided in an audio portion of the content. In an aspect, the transcription of the content can be compared to the specialized list to provide personalized modified content In step 514, the user device can cause display the personalized modified content to at least one of the plurality of users. In an aspect, the personalized modified content can be provided to a single user. For example, each user can view content using a personal device associated with the user and in communication with the user device. The personalized content can be provided to the personal device associated with the user.

Figure 6:
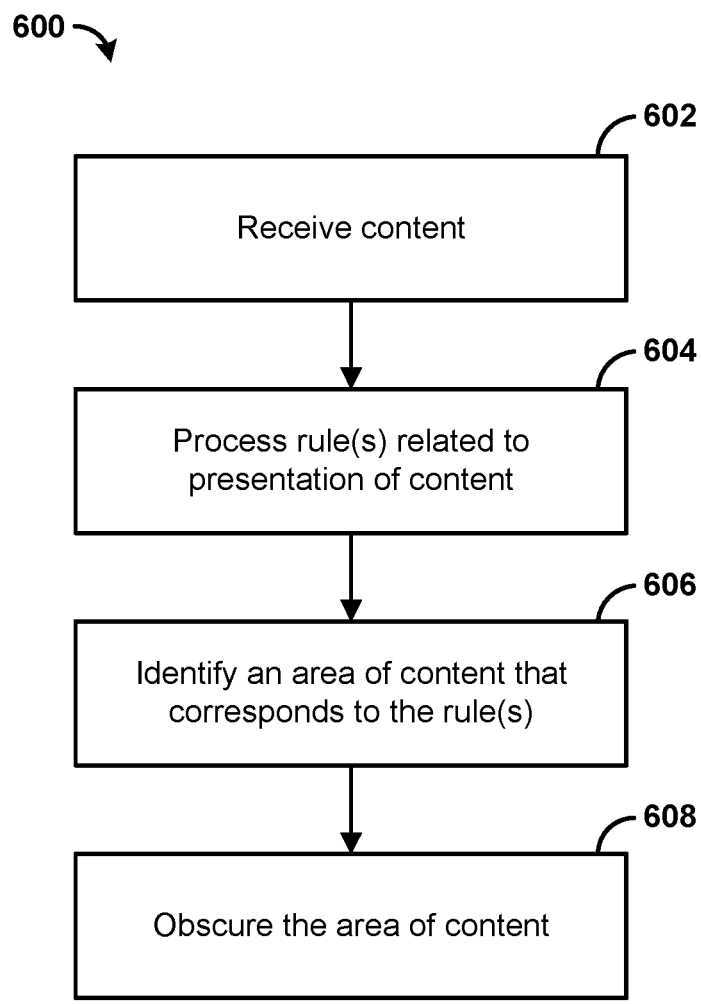
FIG. 6 is a flowchart illustrating an example method.

FIG. 6 shows an exemplary method 600. In step 602, a user device can receive content. In an aspect, the user device can comprise the media device 120, the display 121, the mobile device 124, or other smart devices for providing content to a user. In an aspect, the content can comprise audio and/or video content. The content can be delivered as streaming content, as a file download, or through other known delivery methods. In an aspect, the content can comprise portions. For example, video content can comprise one or more scenes, and audio content can comprise one or more tracks. In an aspect, the content can be received from a content or service provider.

In an aspect, the content can comprise content metadata. The content metadata can comprise information that describes the content. In an aspect, the content metadata can comprise one or more of information about a portion of the content, including information about the performers featured in the content (e.g., actor names, information regarding prominently featured props such as a featured car, etc.), information indicating a location at which the content takes place (e.g., a city, a building, etc.), and communication information (e.g., closed captioning information, a transcription of the dialog, a summary of non-verbal communication, etc.). The content metadata can further comprise, for example, information indicating an importance of the portion of the content to an overall plot of the content. The content metadata can also comprise information about actions taken during the portion of content (e.g., a shooting, a fistfight, a romance, etc.) The content metadata can further comprise viewport location information (e.g., (x, y) coordinates indicating a top left coordinate and/or a bottom right coordinate serving as a corner of a rectangle that covers a particular object and/or word) and trajectory information which can allow a particular object and/or word to be obfuscated or enhanced in appearance over time. The content metadata can also comprise an indication of a time at which an associated event occurred within a storyline of the content (e.g., "universal time" information). In some aspects, the content metadata can further comprise word start and/or end information indicating a start and/or end time of a word within content audio information. In some aspects, the content metadata can further comprise an intensity rating associated with each of the actions. For example, a tag can be assigned a strength value (e.g., between 0 and 1) based on a severity. As a specific example, a "blood" tag can be assigned a strength of 0.1 for a small amount of blood or a strength of 0.98 for a scene with an intense amount of blood.

In an aspect, the content metadata can be transmitted to the user device. In an aspect, the content metadata can be transmitted in a vertical blanking interval of the content. In another aspect, the content metadata can be transmitted to the user device as an additional stream of information within a Motion Picture Experts Group (MPEG) transport stream (TS). In some aspects, a separate packet identifier (PID) can be linked to a program stream that transmits the content through a program map table (PMT).

In step 604, the user device can process one or more rules related to presentation of content. In an aspect, each of the rules processed by the user device can indicate a situation in which the content should be modified. In an aspect, each rule can comprise a modification to one or more of a video component and an audio component of the content. Each rule can also comprise one or more conditions necessary to apply the modification. In an aspect, the one or more conditions can be determined based on the content metadata. For example, a condition can comprise one or more of a presence of blood, particular types of violence (e.g., shooting, stabbing, fist fight, etc.), or sexual content (e.g., kissing, nudity, sexual activity, etc.). If the one or more conditions are satisfied, at least one feature in a portion of the video content can be obscured. In an aspect, obscuring a feature in a portion of the video can comprise blurring, pixelating, blacking out, or applying other masks to the video.

Portions of the audio content can also be obscured or skipped. In an aspect, one or more rules can comprise a condition based on audio content. In particular, the condition can comprise one or more words to be avoided during content. The one or more words can be stored in a data store, such as a database, a list (e.g., a dictionary) associated with a user. In an aspect, the transcription of the dialog can be compared to one or more words in the data store (e.g., the list) to determine if the words in the list are present in the transcription. In an aspect, when one of the words present in the list is also present in the transcription, the portion of audio content can be modified. For example, an audio filter can be applied to the audio portion. In an aspect, the filter can comprise muting, beeping, word replacement, voice removal, or other audio filters. In an aspect, the closed caption information can also be modified to prevent display of the list word. For example, the word can be blurred, pixelated, blacked out, etc. In some aspects, the user device can rewrite the closed caption information substantially in real time to remove the list word so that a displaying device can display the closed caption information without the presence of the list word.

In step 606, the user device can identify an area of the content that corresponds to at least one of the one or more rules. For example, if a rule comprises or specifies conditions for obscuring blood in a displayed image, image analysis techniques can be used to locate an area of content corresponding to blood in an image based on, for example, color. A selected filter can then be applied to at least the portion of the image that includes blood. In another aspect, if the rule identifies a portion of dialog that should be obscured, a timestamp associated with the dialog can be determined based on the transcription information in the content metadata. Further, facial recognition techniques can optionally be used to identify, for example, a mouth of a character voicing the content.

In step 608, the user device can obscure the area of the content before presenting the content. For example, when an area of a video portion of content is located, a filter can be applied to at least the area of content. In particular, a filter can comprise, blurring, pixilation, blacking out, or covering the selected portion with another image. As another example, when a portion of the audio content is identified, an audio filter can be applied to the portion of the audio at the determined timestamp. The audio filter can comprise, for example, muting, beeping, word replacement, voice removal, and the like.

Figure 7:
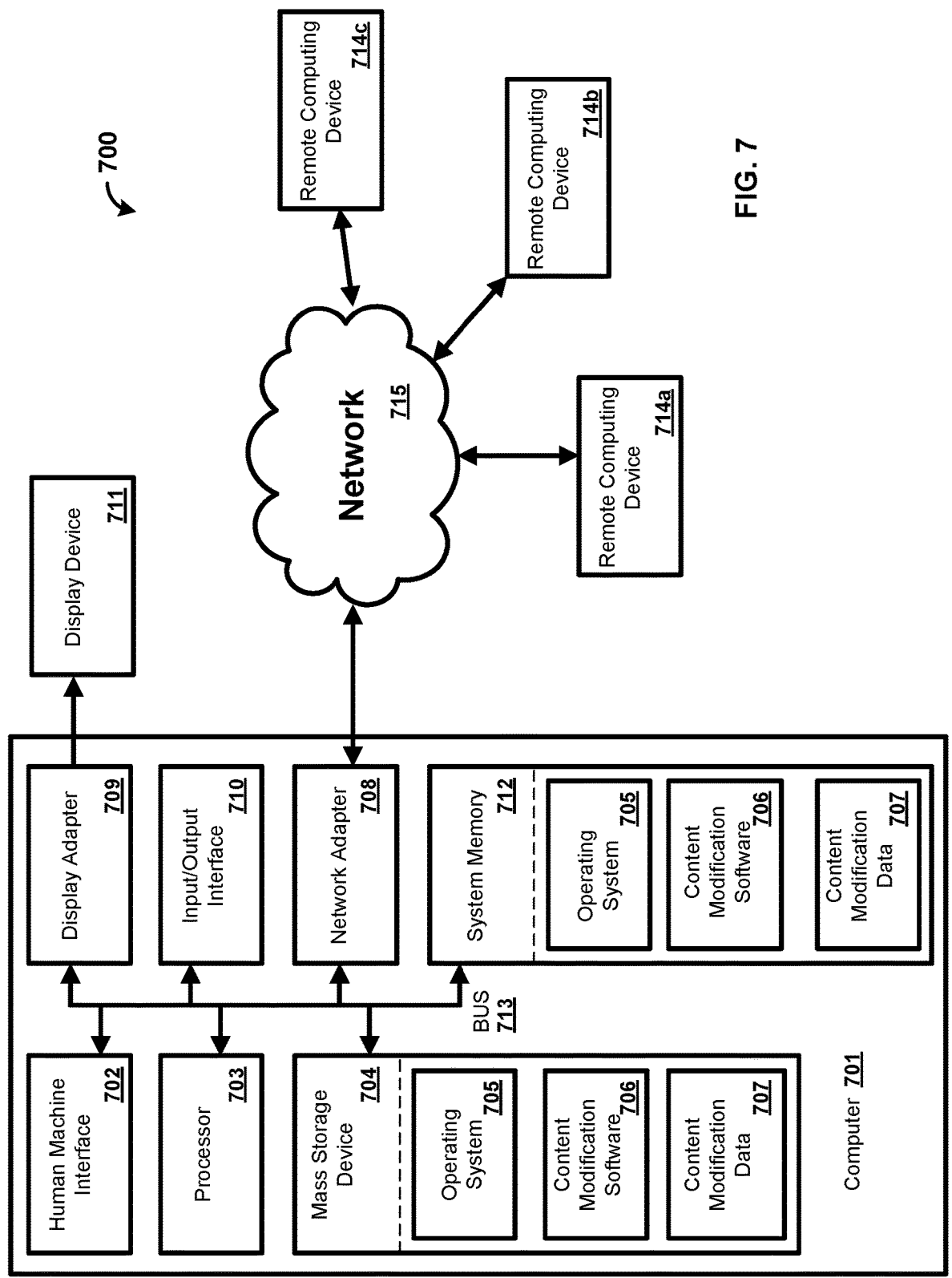
FIG. 7 is a block diagram illustrating an example computing device.

In an exemplary aspect, the methods and systems can be implemented on a computer 701 as illustrated in FIG. 7 and described below. By way of example, the methods and systems disclosed can utilize one or more computers to perform one or more functions in one or more locations. FIG. 7 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 701. The components of the computer 701 can comprise, but are not limited to, one or more processors 703, a system memory 712, and a system bus 713 that couples various system components including the one or more processors 703 to the system memory 712. The system can utilize parallel computing.

The system bus 713 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 713, and all buses specified in this description can also be implemented over a wired or wireless network connection and each of the subsystems, including the one or more processors 703, a mass storage device 704, an operating system 705, content modification software 706, content modification data 707, a network adapter 708, the system memory 712, an Input/Output Interface 710, a display adapter 709, a display device 711, and a human machine interface 702, can be contained within one or more remote computing devices 714*a,b,c* at physically separate locations, connected through buses of this form, in effect implementing a fully distributed system.

The computer 701 typically comprises a variety of computer readable media. Exemplary readable media can be any available media that is accessible by the computer 701 and comprises, for example and not meant to be limiting, both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains data such as the content modification data 707 and/or program modules such as the operating system 705 and the content modification software 706 that are immediately accessible to and/or are presently operated on by the one or more processors 703.

In another aspect, the computer 701 can also comprise other removable/non-removable, volatile/non-volatile computer storage media. By way of example, FIG. 7 illustrates the mass storage device 704 which can provide non-volatile storage of computer code, computer readable instructions, data structures, program modules, and other data for the computer 701. For example and not meant to be limiting, the mass storage device 704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 704, including by way of example, the operating system 705 and the content modification software 706. Each of the operating system 705 and the content modification software 706 (or some combination thereof) can comprise elements of the programming and the content modification software 706. The content modification data 707 can also be stored on the mass storage device 704. The content modification data 707 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 701 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 703 via the human machine interface 702 that is coupled to the system bus 713, but can be connected by other interface and bus structures, such as a parallel port, game port, an IEEE 1394 Port (also known as a Firewire port), a serial port, or a universal serial bus (USB).

In yet another aspect, the display device 711 can also be connected to the system bus 713 via an interface, such as the display adapter 709. It is contemplated that the computer 701 can have more than one display adapter 709 and the computer 701 can have more than one display device 711. For example, a display device can be a monitor, an LCD (Liquid Crystal Display), or a projector. In addition to the display device 711, other output peripheral devices can comprise components such as speakers (not shown) and a printer (not shown) which can be connected to the computer 701 via the Input/Output Interface 710. Any step and/or result of the methods can be output in any form to an output device. Such output can be any form of visual representation, including, but not limited to, textual, graphical, animation, audio, tactile, and the like. The display 711 and computer 701 can be part of one device, or separate devices.

The computer 701 can operate in a networked environment using logical connections to one or more remote computing devices 714a,b,c. By way of example, a remote computing device can be a personal computer, portable computer, smartphone, a server, a router, a network computer, a peer device or other common network node, and so on. Logical connections between the computer 701 and a remote computing device 714a,b,c can be made via a network 715, such as a local area network (LAN) and/or a general wide area network (WAN). Such network connections can be through the network adapter 708. The network adapter 708 can be implemented in both wired and wireless environments. Such networking environments are conventional and commonplace in dwellings, offices, enterprise-wide computer networks, intranets, and the Internet.

For purposes of illustration, application programs and other executable program components such as the operating system 705 are illustrated herein as discrete blocks, although it is recognized that such programs and components reside at various times in different storage components of the computing device 701, and are executed by the one or more processors 703 of the computer. An implementation of the content modification software 706 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:
   receiving content comprising a plurality of video sections;
   receiving importance information indicating an importance of a video section of the plurality of video sections; and causing, based on a plurality of modification options for the video section, output of a modified version of the content, wherein the video section is modified based on the importance information.

2. The method of claim 1, wherein causing the output of the modified version of the content comprises one of causing the video section to be skipped in the output of the modified version of the content or causing at least a portion of video in the video section to be modified in the output of the modified version of the content.

3. The method of claim 1, wherein causing the output of the modified version of the content comprises one of causing an audio portion of the video section to be skipped in the output of the modified version of the content or causing at least a portion of the audio portion to be obscured in the output of the modified version of the content.

4. The method of claim 1, further comprising:
determining the importance information satisfies an importance threshold,
wherein causing the output of the modified version of the content comprises causing, based on the importance information satisfying the importance threshold, one of at least a portion of a video portion of the video section to be modified or at least a portion of an audio portion of the video section to be modified in the output of the modified version of the content.

5. The method of claim 1, further comprising:
determining the importance information does not satisfy an importance threshold,
wherein causing the output of the modified version of the content comprises causing, based on the importance information not satisfying the importance threshold, one of the video section to be skipped or at least a portion of an audio portion of the video section to be skipped in the output of the modified version of the content.

6. The method of claim 1, wherein the importance information indicates the importance of the video section to an overall plot of the content.

7. The method of claim 1, wherein the plurality of modification options comprises one or more of: blurring at least a portion of the video section; pixelating at least the portion of the video section; obscuring at least the portion of the video section; blacking out at least the portion of the video section; applying a mask to at least the portion of the video section; reducing brightness of at least the portion of the video section; obfuscating at least the portion of the video section; or skipping at least the portion of the video section.

8. A method comprising:
receiving content, wherein the content comprises a plurality of video sections;
receiving importance information for a video section of the plurality of video sections, the importance information indicating an importance of the video section to the content;
determining, from a plurality of modification options and based on the importance information, an indication of how to modify the content comprising the video section; and
causing, based on the indication, output of the modified content.

9. The method of claim 8, wherein the importance information indicates the importance of the video section to an overall plot of the content.

10. The method of claim 8, wherein the indication of how to modify the content comprising the video section comprises an indication of how to modify one of a video portion or an audio portion of the video section.

11. The method of claim 8, wherein causing the output of the modified content comprises one of causing the video section to be skipped in the output of the modified content or causing at least a portion of video in the video section to be modified in the output of the modified content.

12. The method of claim 8, wherein causing the output of the modified content comprises one of causing an audio portion of the video section to be skipped in the output of the modified content or causing at least a portion of the audio portion to be obscured in the output of the modified content.

13. The method of claim 8, further comprising:
determining the importance information satisfies an importance threshold,
wherein causing the output of the modified content comprises causing, based on the importance information satisfying the importance threshold, one of at least a portion of a video portion of the video section to be modified or at least a portion of an audio portion of the video section to be modified in the output of the modified content.

14. The method of claim 8, further comprising:
determining the importance information does not satisfy an importance threshold,
wherein causing the output of the modified content comprises causing, based on the importance information not satisfying the importance threshold, one of the video section to be skipped or at least a portion of an audio portion of the video section to be skipped in the output of the modified content.

15. The method of claim 8, wherein the plurality of modification options comprises one or more of: blurring at least a portion of the video section; pixelating at least the portion of the video section; obscuring at least the portion of the video section; blacking out at least the portion of the video section; applying a mask to at least the portion of the video section; reducing brightness of at least the portion of the video section; obfuscating at least the portion of the video section; or skipping at least the portion of the video section.

16. A method comprising:
receiving content comprising a plurality of video sections;
receiving importance information indicating an importance of a video section of the plurality of video sections to the content; and
causing, based on a plurality of modification options for the video section, output of a modified version of the content, wherein the video section is modified based on the importance information.

17. The method of claim 16, further comprising:
determining the importance information satisfies an importance threshold,
wherein causing the output of the modified version of the content comprises causing, based on the importance information satisfying the importance threshold, one of at least a portion of a video portion of the video section to be modified or at least a portion of an audio portion of the video section to be modified in the output of the modified version of the content.

18. The method of claim 16, further comprising:
determining the importance information does not satisfy an importance threshold,
wherein causing the output of the modified version of the content comprises causing, based on the importance information not satisfying the importance threshold, one of the video section to be skipped or at least a portion of an audio portion of the video section to be skipped in the output of the modified version of the content.

19. The method of claim 16, wherein the importance information indicates the importance of the video section to an overall plot of the content.

20. The method of claim 16, further comprising determining, from the plurality of modification options and based on the importance information, an indication of how to modify the video section.

* * * * *